(12) United States Patent
Choi et al.

(10) Patent No.: US 9,319,251 B2
(45) Date of Patent: Apr. 19, 2016

(54) MULTIPLE-INPUT MULTIPLE-OUTPUT (MIMO) COMMUNICATION SYSTEM USING A CODEBOOK AND METHOD OF DESIGNING THE CODEBOOK

(75) Inventors: Junil Choi, Seoul (KR); Bruno Clerckx, Seoul (KR); Ki Il Kim, Yongin-si (KR); David J. Love, West Lafayette, IN (US); Tae Joon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1223 days.

(21) Appl. No.: 12/979,479

(22) Filed: Dec. 28, 2010

(65) Prior Publication Data

US 2011/0164696 A1   Jul. 7, 2011

Related U.S. Application Data

(60) Provisional application No. 61/292,027, filed on Jan. 4, 2010.

(30) Foreign Application Priority Data

Jul. 14, 2010   (KR) ........................ 10-2010-0068064

(51) Int. Cl.
*H04L 27/00*   (2006.01)
*H04L 25/03*   (2006.01)
*H04L 25/02*   (2006.01)
*H04B 7/04*   (2006.01)

(52) U.S. Cl.
CPC ........ *H04L 25/03343* (2013.01); *H04B 7/0478* (2013.01); *H04L 25/021* (2013.01); *H04L 25/0204* (2013.01); *H04L 25/0248* (2013.01); *H04B 7/0465* (2013.01); *H04L 2025/03426* (2013.01); *H04L 2025/03808* (2013.01)

(58) Field of Classification Search
USPC ................... 375/267, 220, 260, 285
See application file for complete search history.

(56) References Cited

U.S. PATENT DOCUMENTS

| 6,847,805 | B2 | 1/2005 | Liu | |
| 2007/0098106 | A1 | 5/2007 | Khojastepour et al. | |
| 2008/0159425 | A1 | 7/2008 | Khojastepour et al. | |
| 2008/0317145 | A1* | 12/2008 | Clerckx et al. | 375/260 |
| 2009/0323840 | A1* | 12/2009 | Lee et al. | 375/260 |
| 2010/0188966 | A1* | 7/2010 | Pun et al. | 370/203 |

FOREIGN PATENT DOCUMENTS

| KR | 10-2005-0073083 | 7/2005 |
| KR | 10-2008-0064187 | 7/2008 |
| KR | 10-2008-0072679 | 8/2008 |

OTHER PUBLICATIONS

Larson, Ron et al., "Elementary Linear Algebra", Fifth Edition, Houghton Mifflin Harcourt, 2003, Chapter 10 "Power Method to Approximating Eigenvalues".*

* cited by examiner

*Primary Examiner* — Dac Ha
*Assistant Examiner* — Janice Tieu
(74) *Attorney, Agent, or Firm* — NSIP Law

(57) ABSTRACT

Provided is a multiple input multiple output (MIMO) communication system using a codebook. A transmitter and a receiver included in the MIMO communication system may generate a codebook having a different size for each eigenvector of a channel matrix or a channel covariance matrix, based on eigenvalues of the channel matrix or the channel covariance matrix.

10 Claims, 8 Drawing Sheets

MULTIPLE-INPUT MULTIPLE-OUTPUT (MIMO) COMMUNICATION SYSTEM USING A CODEBOOK AND METHOD OF DESIGNING THE CODEBOOK

CROSS-REFERENCE TO RELATED APPLICATION(S)

This application claims the benefit under 35 U.S.C. §119 (e) of U.S. Provisional Application No. 61/292,027, filed on Jan. 4, 2010, in the U.S. Patent and Trademark Office, and the benefit under 35 U.S.C. §119(a) of Korean Patent Application No. 10-2010-0068064, filed on Jul. 14, 2010, in the Korean Intellectual Property Office, the entire disclosures of which are incorporated herein by reference for all purposes.

BACKGROUND

1. Field

The following description relates to a multiple-input multiple-output (MIMO) communication system, and more particularly, to a MIMO communication system that may transmit and receive channel information using a codebook.

2. Description of Related Art

In a multiple-input multiple-output (MIMO) communication system, a transmitter and a receiver may use a codebook to transmit and receive channel information. The receiver may measure a channel formed between the transmitter and the receiver, and may generate the codebook based on the channel information. For example, the channel information may include channel direction information and channel quality information.

The transmitter may determine a precoding matrix based on channel information that is fed back from a plurality of receivers. The channel information may be used to determine a precoding matrix. The channel direction information may greatly affect the precoding matrix in a MIMO communication system. In this aspect, the channel direction information is also referred to as a precoding matrix indicator (PMI).

The codebook may include a number of codewords corresponding to a corresponding size of the codebook. For example, a 4-bit codebook may include 16 codewords. In this example, the receiver may select a single codeword from 16 codewords, and may feed back an index of the selected codeword to the transmitter as channel direction information or a PMI.

SUMMARY

In one general aspect, provided is a communication method of a receiver, the communication method comprising calculating an eigenvector matrix comprising eigenvectors of a channel matrix or a channel covariance matrix, generating a codebook for each eigenvector of the eigenvector matrix such that each codebook has a different size based on eigenvalues of the channel matrix or the channel covariance matrix, quantizing each of the eigenvectors using the respective codebook for each eigenvector, and transmitting, to a transmitter, information associated with each of the quantized eigenvectors.

The generating may comprise assigning a weight to a size of a codebook corresponding to each of the eigenvectors based on each of the eigenvectors.

The generating may comprise generating the largest size codebook for a codebook corresponding to a dominant eigenvector from among the eigenvectors.

When the eigenvector matrix comprises a first eigenvector and a second eigenvector, and the first eigenvector corresponds to a first eigenvalue and the second eigenvector corresponds to a second eigenvalue that is less than the first eigenvalue, the generating may comprise generating a larger size codebook for the first eigenvector in comparison to the size of the codebook generated for the second eigenvector.

The quantizing may comprise quantizing an $i^{th}$ eigenvector using a codebook corresponding to the $i^{th}$ eigenvector, projecting a codebook corresponding to an $(i+1)^{th}$ eigenvector onto a null space of the quantized $i^{th}$ eigenvector, and quantizing the $(i+1)^{th}$ eigenvector using the projected codebook corresponding to the $(i+1)^{th}$ eigenvector.

The generating may comprise generating a codebook corresponding to an $(i+1)^{th}$ eigenvector having a size less than a size of a codebook corresponding to an $i^{th}$ dominant eigenvector, using the codebook corresponding to the $i^{th}$ dominant eigenvector, when the $i^{th}$ dominant eigenvector is quantized using the codebook corresponding to the $i^{th}$ dominant eigenvector, and the quantizing may comprise projecting the codebook corresponding to the $(i+1)^{th}$ eigenvector onto a null space of the quantized $i^{th}$ eigenvector, and quantizing the $(i+1)^{th}$ eigenvector using the projected codebook corresponding to the $(i+1)^{th}$ eigenvector.

The communication method may further comprise quantizing each eigenvalue using a scalar codebook such that each eigenvalue is quantized using a scalar codebook having a different size, and transmitting, to the transmitter, information associated with each of the eigenvalues quantized.

In another aspect, there is provided a communication method of a transmitter, the communication method comprising generating a codebook for each eigenvector of a channel matrix or a channel covariance matrix, such that each codebook has a different size based on eigenvalues of the channel matrix or the channel covariance matrix, receiving information associated with each of quantized eigenvectors, and obtaining the quantized eigenvectors using information associated with each of the quantized eigenvectors and the respective codebooks for each eigenvector.

The generating may comprise generating the largest size codebook for a codebook corresponding to a dominant eigenvector from among the eigenvectors.

In another aspect, there is provided a communication method of a receiver, the communication method comprising generating a matrix of a lower dimensional form through triangularization of a channel matrix or a channel covariance matrix that comprises a plurality of channel vectors, generating a codebook corresponding to each of the vectors comprised in the matrix of the lower dimensional form, based on an effective dimension of the vectors, quantizing each of the vectors using the codebook corresponding to each of the vectors, and transmitting, to a transmitter, information associated with each of the quantized vectors.

The generating may comprise filling upper triangular components of the matrix of the lower triangular form with components associated with the channel vectors.

The generating may comprise generating the codebook corresponding to each of the vectors such that a size of a codebook corresponding to a first vector is larger than a size of a codebook corresponding to a second vector, and the vectors may comprise the first vector and the second vector, and each of the first vector and the second vector may have a different effective dimension.

In another aspect, there is provided a computer-readable storage medium having stored therein program instructions to cause a processor to execute a communication method of a receiver, the communication method comprising calculating an eigenvector matrix comprising eigenvectors of a channel matrix or a channel covariance matrix, generating a codebook for each eigenvector of the eigenvector matrix such that each codebook has a different size based on eigenvalues of the channel matrix or the channel covariance matrix, quantizing each of the eigenvectors using the respective codebook for each eigenvector, and transmitting, to a transmitter, information associated with each of the quantized eigenvectors.

In another aspect, there is provided a terminal comprising a codebook generator configured to calculate an eigenvector matrix that comprises a plurality of eigenvectors of a channel matrix or a channel covariance matrix which are based on a channel formed between the terminal and a receiver, configured to generate a codebook for each eigenvector of the eigenvector matrix, and configured to quantize each respective eigenvector, and a transmitter configured to transmit information about the quantized eigenvectors to the receiver, wherein the codebook generator generates at least two codebooks of different size based on eigenvalues of each eigenvector.

The codebook generator may generate a largest size codebook for an eigenvector comprising the largest eigenvalue.

The codebook generator may generate a smallest size codebook for an eigenvector comprising the smallest eigenvalue.

The codebook generator may generate a larger size codebook for dominant eigenvectors and may generate a smaller size codebook for non-dominant eigenvectors.

Other features and aspects will be apparent from the following detailed description, the drawings, and the claims.

Figure 1:
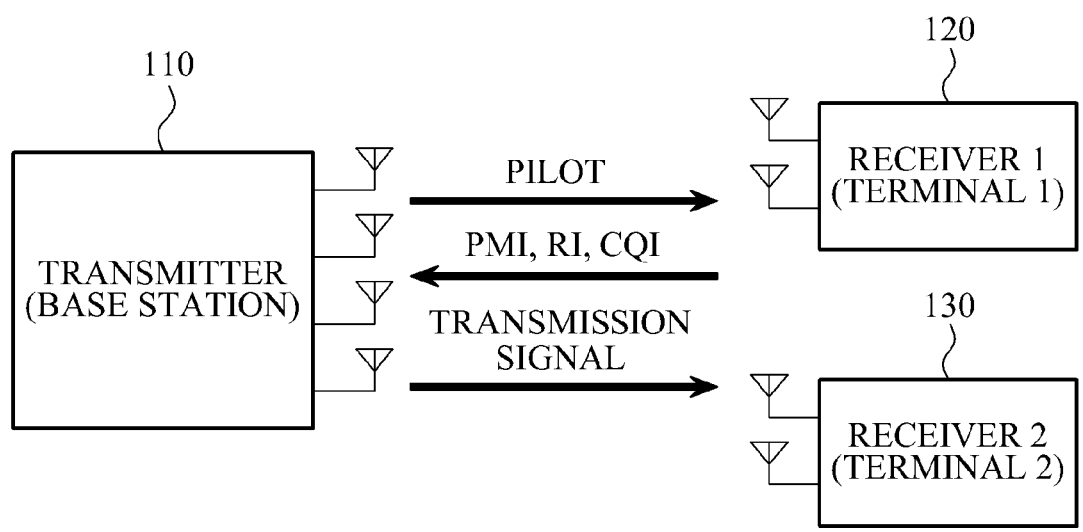
FIG. 1 is a diagram illustrating an example of a closed-loop multi-user multiple-input multiple-output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity to and conciseness.

It should be appreciated that the transmitter described herein may be a base station, a terminal, and the like. It should also be appreciated that the receiver described herein may be a base station, a terminal, and the like. It should also be understood that the transmitter described herein may also function as a receiver, and vice versa.

FIG. 1 illustrates an example of a closed-loop multi-user multiple-input multiple-output (MIMO) communication system.

Referring to FIG. 1, the closed-loop multi-user MIMO communication system includes a transmitter 110, a receiver (1) 120, and a receiver (2) 130. As an example, in a downlink transmission, the transmitter 110 may be a base station, the receiver (1) 120 may be a terminal 1, and the receiver (2) 130 may be a terminal 2.

To perform spatial multiplexing, the transmitter 110 may verify information associated with a channel formed between the transmitter 110 and the receiver (1) 120 and a channel formed between the transmitter 110 and the receiver (2) 130. Hereinafter, the information is referred to as channel information. The transmitter 110 may determine an optimal precoding matrix based on the channel information.

The transmitter 110 may transmit a pilot to each of the receiver (1) 120 and the receiver (2) 130. In response, the receiver (1) 120 and the receiver (2) 130 may measure a corresponding channel based on the pilot. For example, the receiver (1) 120 may measure a corresponding channel between the receiver (1) 120 and the transmitter 110. The channel may be represented in a form of a matrix. For example, the channel formed from the transmitter 110 to the receiver (1) 120 may be represented by a channel matrix $H_1$, and the channel formed from the transmitter 110 to the receiver (2) 130 may be represented by a channel matrix $H_2$. The channel matrix $H_1$ or the channel matrix $H_2$ may have a dimension of $M_r \times M_t$. In this example, $M_r$ corresponds to a number of receive antennas installed in a corresponding receiver and $M_t$ corresponds to a number of transmit antennas installed in the transmitter 110.

With respect to a given channel matrix H that is one of the channel matrix $H_1$ or the channel matrix $H_2$, a channel covariance matrix may be represented by $H^H H$. In this example, $H^H$ corresponds to Hermitian of H. A rank M of the channel covariance matrix $H^H H$ may be greater than or equal to 1 and less than or equal to $\min(M_r, M_t)$.

For example, the receiver (1) 120 and the receiver (2) 130 may feed back, to the transmitter 110, a precoding matrix indicator (PMI), a preferred rank indicator (RI), and channel quality information (CQI), based on the channel matrix H or the channel covariance matrix $H^H H$. Accordingly, the transmitter 110 may determine an optimal precoding matrix based on the PMI, the RI, and the CQI fed back from each of the receiver (1) 120 and the receiver (2) 130.

For example, the transmitter 110 may transmit a transmission signal by performing precoding using the determined precoding matrix. The transmitter may transmit the transmission signal using a plurality of transmit antennas, for example, two transmit antennas, four transmit antennas, eight transmit antennas, and the like.

Direction information associated with the channel matrix H or the channel covariance matrix $H^H H$ may be represented as direction information associated with an eigenvector matrix of the channel matrix H or of the channel covariance matrix $H^H H$. Accordingly, direction information associated with the eigenvector matrix of the channel matrix H or of the channel covariance matrix $H^H H$ may be generated as a PMI of each of the receiver (1) 120 and the receiver (2) 130. Hereinafter, it is assumed that the eigenvector matrix indicates one eigenvector matrix of the channel matrix H and the channel covariance matrix $H^H H$.

For example, in a first scheme, the receiver (1) 120 and the receiver (2) 130 may quantize an eigenvector matrix as a whole and generate information associated with the quantized eigenvector matrix as the PMI. In this example, the same number of bits may be assigned to each of eigenvectors included in the eigenvector matrix. For example, when information associated with the quantized eigenvector matrix is limited to a total of eight bits, and the eigenvector matrix includes four eigenvectors, the aforementioned scheme may equally assign two bits to each of the four eigenvectors.

For example, in a second scheme, a different number of bits may be assigned to each of the eigenvectors included in the eigenvector matrix. For example, an important vector such as a dominant eigenvector may exist, from among the plurality of eigenvectors. Accordingly, a greater number of bits may be assigned to the important vector such as the dominant eigenvector, and a lesser number of bits may be assigned to a relatively less important vector.

Hereinafter, the second scheme will be further described. For concise description, it is assumed that each of the receiver (1) 120 and the receiver (2) 130 quantizes an eigenvector matrix U of the channel covariance matrix $H^H H$, and feeds back a PMI to the transmitter 110.

For example, the eigenvector matrix U may include at least one eigenvector, and each of the at least one eigenvector included in the eigenvector matrix U may be aligned based on corresponding eigenvalues. For example, a first column vector included in the eigenvector matrix U may be a dominant eigenvector corresponding to a largest eigenvalue, and a last column vector may be an eigenvector corresponding to a smallest eigenvalue. In comparison to other eigenvectors, for example, the dominant eigenvector associated with the dominant eigenvalue may have a greater impact on representing the channel covariance matrix $H^H H$ or the eigenvector matrix U. Accordingly, a larger number of bits may be assigned to the dominant eigenvector in comparison to the number of bits assigned to the other eigenvectors. The dominant eigenvector may be quantized using a larger number of bits.

For example, if a codebook for quantizing an eigenvector $u_i$ is $F_i$ and a size of the codebook $F_i$ is $N_i$, the codebook $F_i$ may be expressed by $F_i = \{f_1\ f_2\ \ldots\ f_{N_i}\}$. In this example, $N_1 \geq N_2 \geq \ldots N_M$. $F_1$ may correspond to a codebook for quantizing the dominant eigenvector, and may have a size of $N_1$. $F_1$ may have the largest size from among codebooks for quantizing other eigenvectors. $F_M$ may correspond to a codebook for quantizing an $M^{th}$ eigenvector and may have a size of $N_M$. $F_M$ may have the smallest size from among the codebooks for quantizing the other eigenvectors.

For example, sequences of the codebooks may be given as below.

$$F_1 = \{f_{1,1}, f_{1,2}, \ldots, f_{1,N_1}\}$$
$$F_2 = \{f_{2,1}, f_{2,2}, \ldots, f_{2,N_2}\}$$
$$\ldots$$
$$F_M = \{f_{M,1}, f_{M,2}, \ldots, f_{M,N_M}\}$$

When a number of all the codewords used to quantize all of the eigenvectors included in the eigenvector matrix is limited to N, $$N = \sum_{i=1}^{M} N_i.$$

In this example, the size $N_i$ of the codebook $F_i$ may be determined by $$N_i = \frac{E[\lambda_i]}{\sum_{k=1}^{M} E[\lambda_k]} N.$$

For example, quantization of each eigenvector may be described as a successive projection procedure as below:
Initialize: $F_1^{(P)} = F_1$, i=1
For each "i", recursively apply the following operations:
1) Quantize an $i^{th}$ dominant eigenvector $u_i$ of $H^H H$ with $F_i^{(P)}$ $$f_i = \underset{f \in F_i^{(P)}}{\operatorname{argmax}} |u_i^* f|^2$$

2) Project $F_{i+1}$ onto a null space of the quantized $i^{th}$ dominant eigenvector $f_i$ and generate a projected codebook $F_{i+1}^{(p)}$ $$F_{i+1}^{(p)} = \text{Normalize}\left(\prod_{k=1}^{i}(I_{M_t} - f_k f_k^*) F_{i+1}\right)$$

where the function 'Normalize(A)' indicates the normalizing of each vector included in A so that each vector has a unit norm.
3) Set i=i+1, and repeat the operations 1) through 3) if i is less than M+1
Generate the quantized eigenvector matrix:
$\hat{U} = [f_1, f_2, \ldots f_M]$ Feed back, to the transmitter 110 as a PMI, an index of each of quantized eigenvectors included in the quantized eigenvector matrix.

The aforementioned successive projection procedure may be configured using only a single codebook $F_1$ as below:
Initialize: $F_1^{(P)} = F_1$, i=1
For each "i", recursively apply the following operations:
1) Quantize an $i^{th}$ dominant eigenvector $u_i$ of $H^H H$ with $F_i^{(P)}$ $$f_i = \underset{f \in F_i^{(P)}}{\operatorname{argmax}} |u_i^* f|^2$$

2) Generate a new codebook $F_{i+1}$ for quantizing an $(i+1)^{th}$ dominant eigenvector $u_{i+1}$ excluding $f_i$ from $F_i^{(P)}$
3) Project $F_{i+1}$ onto a null space of the quantized $i^{th}$ dominant eigenvector $f_i$, and generate the projected codebook $F_{i+1}^{(p)}$ $$F_{i+1}^{(p)} = \text{Normalize}\left(\prod_{k=1}^{i}(I_{M_t} - f_k f_k^*) F_{i+1}\right)$$

4) Set i=i+1, and recursively perform operations 1) through 3) if i is less than M+1

Generate the quantized eigenvector matrix $$\hat{U}=[f_1, f_2, \ldots, f_M]$$

Feed back, to the transmitter 110 as a PMI, an index of each of quantized eigenvectors included in the quantized eigenvector matrix.

In the process of generating the new codebook $F_{i+1}$ or the process of generating $F_{i+1}^{(p)}$, a criterion of $|F_1^{(p)}|=N_1 > |F_2^{(p)}|=N_1-1 > \ldots > |F_M^{(p)}|=N_1-M+1$ may be applicable.

For example, a codebook that has a different size may be assigned to each of eigenvectors such that each codebook has a different size, and a scalar codebook having a different size may be assigned to each of eigenvalues. For example, a dominant eigenvalue may be quantized using a codebook having a larger size than other eigenvalues. Information associated with each of the quantized eigenvalues may be transmitted, as CQI, from each of the receiver (1) 120 and the receiver (2) 130 to the transmitter 110.

For example, a first codebook may have a first size, a second codebook may have a second size, and a third codebook may have a third size. The first size may be greater in size than the second size and the second size may be greater in size than the third codebook. The first through third codebooks could be assigned to a first through third eigenvectors, respectively.

As another example, a codebook having the same size may be assigned to some of the eigenvectors, and a codebook having a different size may be assigned to one or more other eigenvectors. For example, a first codebook could have a first size, a second codebook could have a second size, and a third and fourth codebook could each have a third size. The first size could be greater in size than the second size, and the second size could be greater in size than the third size. The first through fourth codebooks could be assigned to a first through fourth eigenvectors, respectively.

An $i^{th}$ eigenvalue $\lambda_i$ may be quantized using a scalar codebook $\Lambda_i = \{\gamma_{i,1}, \gamma_{i,2}, \ldots \gamma_{i,K_i}\}$. A size of each scalar codebook may be determined according to constraints such as. $|\Lambda_1| \geq |\Lambda_2| \ldots \geq |\Lambda_M|$. For example, scalar codebooks may be expressed as follows:

$$\Lambda_1 = \{\gamma_{1,1}, \gamma_{1,2}, \ldots, \gamma_{1,K_1}\}$$

$$\Lambda_2 = \{\gamma_{2,1}, \gamma_{2,2}, \ldots, \gamma_{2,K_2}\}$$

$$\ldots$$

$$\Lambda_M = \{\gamma_{M,1}, \gamma_{M,2}, \ldots, \gamma_{M,K_M}\}$$

When a number of all the codewords of scalar codebooks used for quantizing all of eigenvalues is limited to K, $$K = \sum_{i=1}^{M} K_i.$$

A size of each scalar codebook may be determined by $$K_i = \frac{E[\lambda_i]}{\sum_{k=1}^{M} E[\lambda_k]} K.$$

The $i^{th}$ eigenvalue $\lambda_i$ may be quantized to $$\gamma_i = \underset{\gamma \in \Lambda_i}{\operatorname{argmin}} |\gamma - \lambda_i|.$$

The receiver (1) 120 and the receiver (2) 130 may transmit, to the transmitter 110, information associated with the quantized eigenvalues $\gamma_1, \ldots, \gamma_M$.

For example, the receiver (1) 120 and the receiver (2) 130 may transmit, to the transmitter 110 as a PMI or channel direction information (CDI), information associated with each of the quantized eigenvectors, and may transmit, to the transmitter 110 as CQI, information associated with each of the quantized eigenvalues.

Figure 2:
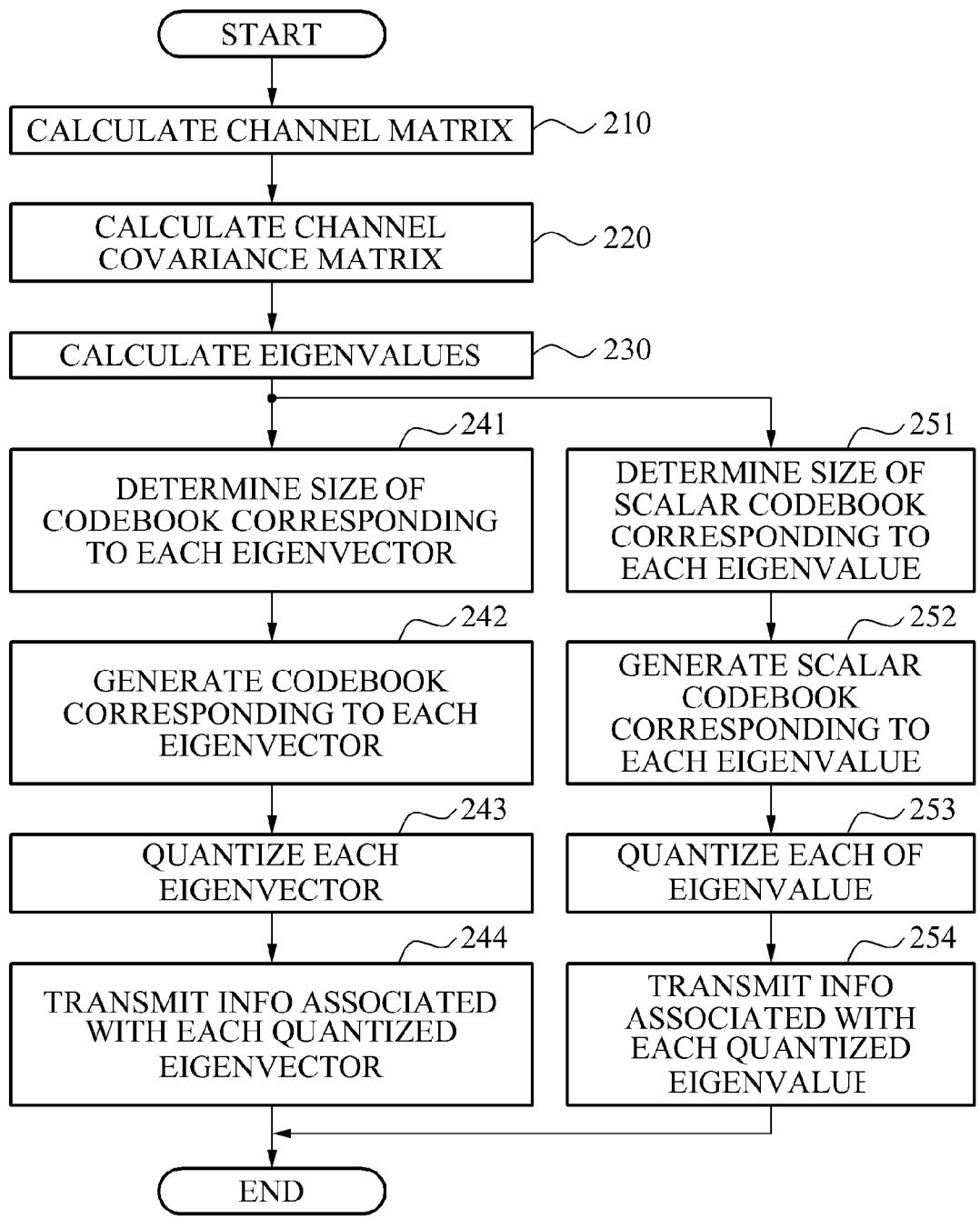
FIG. 2 is a flowchart illustrating an example of a communication method of a receiver using a codebook corresponding to each eigenvector.

FIG. 2 illustrates an example of a communication method of a receiver using a codebook corresponding to each eigenvector.

In 210, the receiver calculates a channel matrix H formed between a transmitter and the receiver. For example, the receiver may calculate the channel matrix H using a pilot transmitted from the transmitter.

In 220, the receiver calculates a channel covariance matrix $H^H H$ using the channel to matrix H. Hereinafter, it is assumed that the receiver quantizes an eigenvector matrix of the channel covariance matrix $H^H H$. The same principle is applicable to a case where the receiver quantizes the channel matrix H.

When a calculation of the channel covariance matrix $H^H H$ is completed, the receiver calculates eigenvalues of the channel covariance matrix $H^H H$, in 230. When the eigenvalues of the channel covariance matrix $H^H H$ are calculated, an eigenvector matrix including eigenvectors of the channel covariance matrix $H^H H$ may be calculated.

In 241, the receiver may determine a size of a codebook for each of the eigenvectors. For example, the receiver may determine the size of the codebook for each of the eigenvectors using $$N_i = \frac{E[\lambda_i]}{\sum_{k=1}^{M} E[\lambda_k]} N.$$

For example, a weight may be assigned to the size of the codebook corresponding to each of the eigenvectors, based on a corresponding eigenvalue. The receiver may determine the size of the codebook corresponding to each of the eigenvectors based on the assigned weight. For example, a size of a codebook for quantizing an eigenvector corresponding to a relatively great eigenvalue may be determined to be relatively large. A size of a codebook for quantizing an eigenvector corresponding to a relatively small eigenvalue may be determined to be relatively small.

In 242, the receiver generates the codebook corresponding to each of the eigenvectors. For example, the receiver may generate the codebook corresponding to each of the eigenvectors as follows:

$$F_1 = \{f_{1,1}, f_{1,2}, \ldots, f_{1,N_1}\}$$
$$F_2 = \{f_{2,1}, f_{2,2}, \ldots, f_{2,N_2}\}$$
$$\ldots$$
$$F_M = \{f_{M,1}, f_{M,2}, \ldots, f_{M,N_M}\}$$

In 243, the receiver quantizes each of the eigenvectors using the codebook corresponding to each of the eigenvectors. For example, the receiver may quantize each of the eigenvectors using the aforementioned successive projection procedure.

For example, the receiver may quantize an $i^{th}$ dominant eigenvector $u_i$ with $F_i^{(P)}$, project $F_{i+1}$ onto a null space of the quantized $i^{th}$ dominant eigenvector $f_i$ and generate a projected codebook $F_{+1}^{(P)}$. The receiver may set i=i+1, and may repeat the aforementioned process if i is less than M+1. Accordingly, the receiver may obtain each of the quantized eigenvectors. For example, $F_{i+1}$ may be predetermined based on a corresponding eigenvalue, and may also be newly generated using $f_i$ and $F_i^{(P)}$.

When the quantized eigenvector matrix $\hat{U}=[f_1, f_2, \ldots, f_M]$ is generated, in 244 the receiver transmits, to the transmitter, information associated with each of the quantized eigenvectors.

In 251, the receiver determines a size of a scalar codebook corresponding to each of the eigenvalues, based on the eigenvalues. For example, each scalar codebook may have a different size based on the codebook's respective eigenvalue, and the size of the scalar codebook may be adaptively changed based on each of the eigenvalues. For example, the size of a scalar codebook for quantizing a relatively great eigenvalue may be determined to be relatively large, and a size of a scalar codebook for quantizing a relatively small eigenvalue may be determined to be relatively small.

In 252, the receiver generates the scalar codebook corresponding to each of the eigenvalues based on a corresponding size.

For example, the scalar codebook may be generated as follows:

$$\Lambda_1 = \{\gamma_{1,1}, \gamma_{1,2}, \ldots, \gamma_{1,K_1}\}$$
$$\Lambda_2 = \{\gamma_{2,1}, \gamma_{2,2}, \ldots, \gamma_{2,K_2}\}$$
$$\ldots$$
$$\Lambda_M = \{\gamma_{M,1}, \gamma_{M,2}, \ldots, \gamma_{M,K_M}\}$$

For example, the size of each scalar codebook may be determined by $$K_i = \frac{E[\lambda_i]}{\sum_{k=1}^{M} E[\lambda_k]} K.$$

In 253, the receiver quantizes each of the eigenvalues using each of the scalar codebooks.

When each of the eigenvalues is quantized, information associated with each of the quantized eigenvalues is transmitted to the transmitter, in 254.

Figure 3:
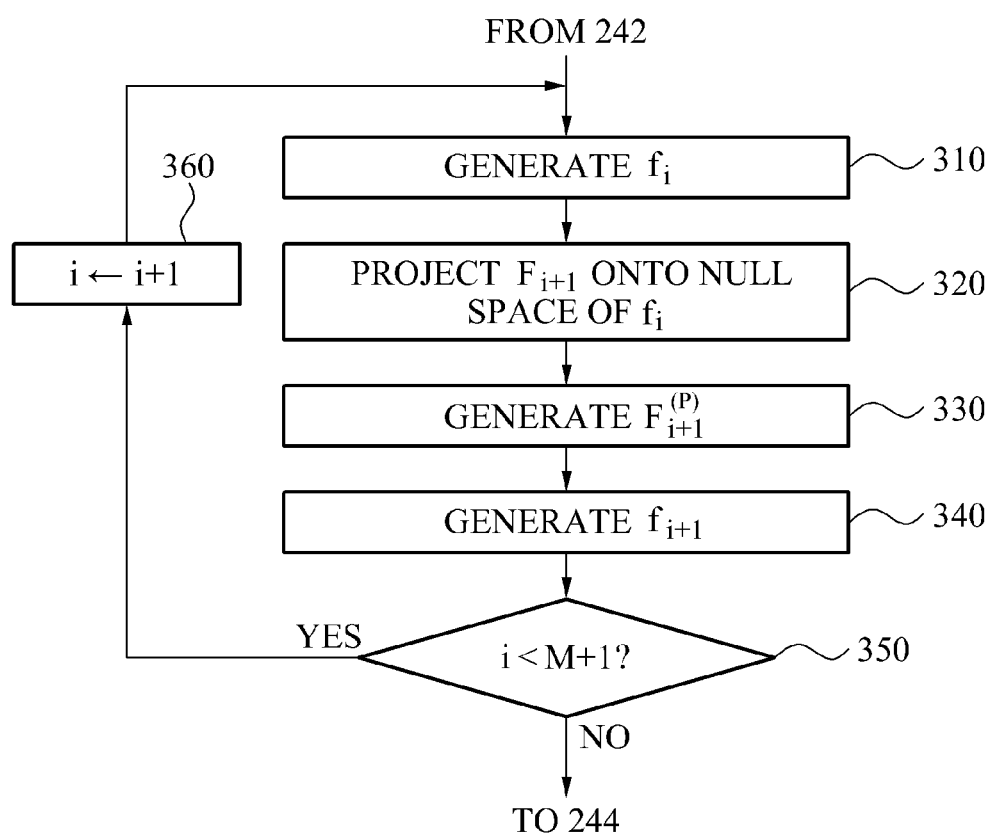
FIG. 3 is a flowchart illustrating an example of generating a codebook for each eigenvector.

FIG. 3 illustrates an example of generating a codebook for each eigenvector.

In 310, the receiver quantizes an $i^{th}$ eigenvector using a codebook corresponding to the $i^{th}$ eigenvector to generate a quantized eigenvector. The quantized $i^{th}$ eigenvector is referred to as $f_i$.

In 320 and 330, the receiver generates a projected codebook $F_{i+1}^{(p)}$ by projecting a codebook $F_{i+1}$ corresponding to an $(i+1)^{th}$ eigenvector onto a null space of the quantized $i^{th}$ eigenvector $f_i$.

In 340, the receiver generates $f_{i+1}$ by quantizing the $(i+1)^{th}$ eigenvector using the projected codebook $F_{+1}^{(p)}$.

In 350, the receiver determines whether i is less than M+1. When i is less than M+1, the receiver sets "i" to "i+1," in 360. Conversely, when i is greater than or equal to M+1, operation 244 of FIG. 2 may be performed.

The aforementioned process may be repeated until "i" is greater than or equal to "M+1". Through this recursive procedure, each eigenvector may be quantized.

Figure 4:
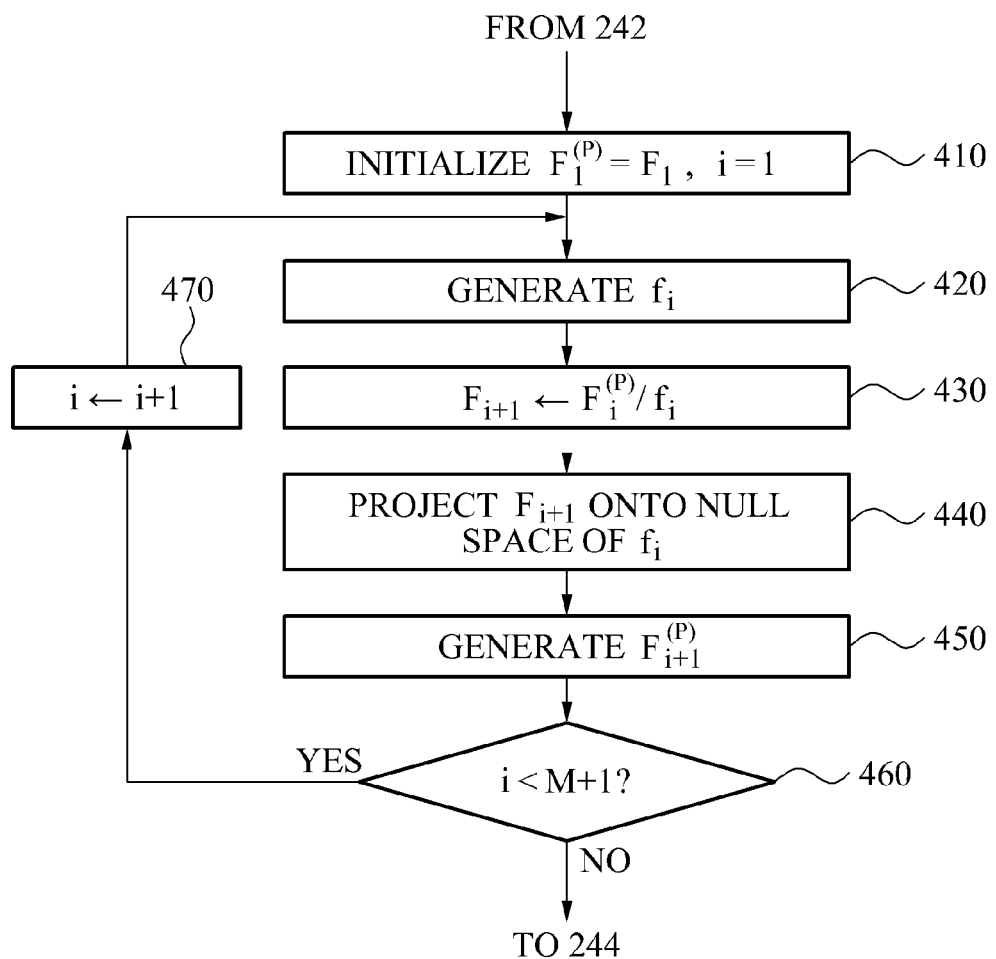
FIG. 4 is a flowchart illustrating another example of generating a codebook for each eigenvector.

FIG. 4 illustrates another example of generating a codebook for each eigenvector.

Referring to FIG. 4, in 410, the receiver initializes $F_1^{(p)}=F_1$, i=1.

In 420, the receiver generates $f_i$ by quantizing an $i^{th}$ dominant eigenvector using $F_1^{(p)}=F_1$. Here, because i=1, $f_1$ may be generated.

In 430, the receiver generates a codebook $F_{i+1}$ corresponding to an $(i+1)^{th}$ eigenvector that has a size less than a size of a codebook corresponding to the $i^{th}$ eigenvector using a codebook $F_i^{(p)}$ corresponding to the $i^{th}$ eigenvector and $f_i$.

In 440 and 450, the receiver generate $F_{+1}^{(p)}$ by projecting the codebook $F_{i+1}$ onto a null space of $f_i$.

In 460, the receiver determines whether i is less than M+1. When i is less than M+1, the receiver may set "i" to "i+1," in 470. Conversely, when i is greater than or equal to M+1, operation 244 of FIG. 2 may be performed.

Accordingly, all the eigenvectors may be quantized through a successive projection procedure using a single codebook $F_1^{(p)}=F_1$.

Figure 5:
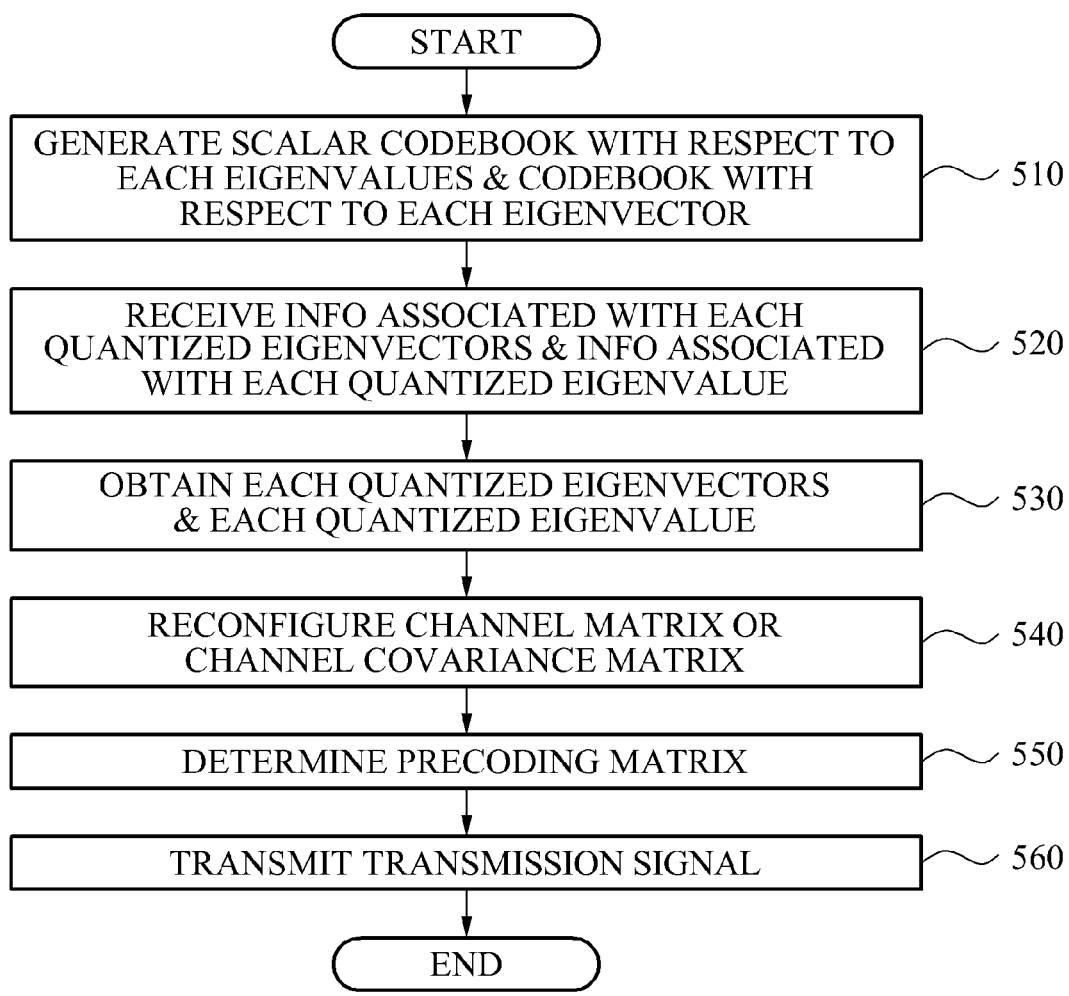
FIG. 5 is a flowchart illustrating an example of a communication method of a transmitter.

FIG. 5 illustrates an example of a communication method of a transmitter. Referring to FIG. 5, in 510, the transmitter generates a scalar codebook for each of eigenvalue of a channel matrix or a channel covariance matrix, and generates a codebook for each eigenvector of the channel matrix or the channel covariance matrix, based on the eigenvalues. The scalar codebook for each eigenvalue may have a different size for each respective eigenvalue, and the codebook for each eigenvector may also have a different size. A method of generating the scalar codebook for each eigenvalue and a method of generating the codebook for each eigenvector is described above, and thus, further description is omitted here.

In 520, the transmitter receives, from a receiver, information associated with each of the quantized eigenvectors and information associated with each of the quantized eigenvalues. For example, information associated with each of the quantized eigenvectors may correspond to a PMI or CDI, and information associated with each of the quantized eigenvalues may correspond to CQI.

In 530, the transmitter obtains each of the quantized eigenvectors from information associated with each of the quantized eigenvectors by referring to the codebook with respect to each of the eigenvectors, and obtains each of the quantized eigenvalues from information associated with each of the quantized eigenvalues by referring to the scalar codebook with respect to each of the eigenvalues.

In 540, the transmitter reconfigures the channel matrix or the channel covariance matrix using each of the quantized eigenvectors and each of the quantized eigenvalues. For example, when each of the quantized eigenvectors and each of the quantized eigenvalues are given with respect to the channel matrix or the channel covariance matrix, the channel matrix or the channel covariance matrix may be given by $$[f_1 \ldots f_M] \mathrm{diag}([\gamma_1 \ldots \gamma_M])[f_1 \ldots f_M]^*$$

In this example, diag(a, b, c) corresponds to a diagonal matrix including a, b, and c as to diagonal elements.

In 550, the transmitter determines a precoding matrix using the reconfigured channel matrix or channel covariance matrix. In 560, the transmitter transmits a transmission signal by precoding at least one data stream using the precoding matrix. The transmission signal may be transmitted to the receiver via a plurality of transmit antennas.

A method of generating and using codebooks and scalar codebooks having different sizes based on eigenvalues of a channel matrix or a channel covariance matrix is described above. Hereinafter, a technology for reducing feedback overhead by reducing at least one effective dimension among channel vectors included in the channel matrix or the channel covariance matrix is described.

Another Codebook Generation Scheme

For example, an R matrix may be generated by applying a QR decomposition to a channel matrix H. In this example, H=QR and R corresponds to an upper triangular matrix. A channel covariance matrix may be represented by $R^H R$.

When a rank is M and the channel matrix H is represented by $H=\{h_1, h_2, \ldots, h_{Mt}\}$, Q matrix and R matrix of H may be expressed as below.

$$Q = [q_1 \ldots q_M], q_m \in C^{Mr \times 1},$$

$$q_m = \frac{h_m - \sum_{i=1}^{m-1} q_i^* h_m q_i}{\left\| h_m - \sum_{i=1}^{m-1} q_i^* h_m q_i \right\|}$$

$$R = \{r_{mn}\}, r_{mn} \in C$$

In this example, $r_{mn}$ may be determined by:

When M is greater than or equal to a maximum value between m and n, $$r_{mn} = \begin{cases} q_m^* h_n & \text{if } m \neq n \\ \left\| h_m - \sum_{i=1}^{m-1} q_i^* h_m q_i \right\| & \text{if } m = M \end{cases}$$

When M is greater than or equal to m and is less than n, $$r_{mn} = \begin{cases} q_m^* h_n & \text{if } m \neq M \\ \left\| h_n - \sum_{i=1}^{m-1} q_i^* h_n q_i \right\| & \text{if } m = M \end{cases}$$

When m is greater than M, $$r_{mn} = 0$$

The upper triangular matrix R may always be decomposed into a matrix with unit norm vectors and a diagonal matrix including a norm of $h_n$ as diagonal elements. For example, in the case of a 4×4 channel matrix with rank 4, the upper triangular matrix R may be decomposed as given by $$QR_{4\times 4} = H = [h_1\ h_2\ h_3\ h_4] \in C^{4\times 4}$$

$$R_{4\times 4} = \begin{bmatrix} r_{11} & q_1^* h_2 & q_1^* h_3 & q_1^* h_4 \\ 0 & r_{22} & q_2^* h_3 & q_2^* h_4 \\ 0 & 0 & r_{33} & q_3^* h_4 \\ 0 & 0 & 0 & r_{44} \end{bmatrix}$$

with $$R_{11} = \|h_1\|$$

$$r_{22} = \|h_2 - q_1^* h_2 q_1\| = \|h_2\| \tilde{r}_{22}$$

$$r_{33} = \|h_3 - q_1^* h_3 q_1 - q_2^* h_3 q_2\| = \|h_3\| \tilde{r}_{33}$$

$$r_{44} = \|h_4 - q_1^* h_4 q_1 - q_2^* h_4 q_2 - q_3^* h_4 q_3\| = \|h_4\| \tilde{r}_{44}$$

$R_{4\times 4}$ may be decomposed into a matrix with unit norm vectors and a diagonal matrix as below $$R_{4\times 4} = \begin{bmatrix} r_{11} & q_1^* h_2 & q_1^* h_3 & q_1^* h_4 \\ 0 & r_{22} & q_2^* h_3 & q_2^* h_4 \\ 0 & 0 & r_{33} & q_3^* h_4 \\ 0 & 0 & 0 & r_{44} \end{bmatrix}$$

$$= \begin{bmatrix} 1 & q_1^* \tilde{h}_2 & q_1^* \tilde{h}_3 & q_1^* \tilde{h}_4 \\ 0 & \tilde{r}_{22} & q_2^* \tilde{h}_3 & q_2^* \tilde{h}_4 \\ 0 & 0 & \tilde{r}_{33} & q_3^* \tilde{h}_4 \\ 0 & 0 & 0 & \tilde{r}_{44} \end{bmatrix} \mathrm{diag}(\|h_1\|, \|h_2\|, \|h_3\|, \|h_4\|)$$

$$= BD$$

In this example, $$\tilde{h}_n = \frac{h_n}{\|h_n\|}.$$

Each column of a matrix B is within a unit norm space.

When quantizing a column including $r_{mn}$ of which a row index is equal to a column index of $r_{mn}$ (i.e., m=n), an $n^{th}$ column of B may be quantized to $$f_n = \operatorname*{argmax}_{f \in F_n} |b_n^* f|^2$$

using a codebook. $F_n = \{f_1^n, f_2^n, \ldots, f_{Nn}^n\}$. In this example, $F_n = \{f_1^n, f_2^n, \ldots, f_{Nn}^n\}$ corresponds to an m-dimensional codebook, and thus, each of codewords included in $F_n = \{f_1^n, f_2^n, \ldots, f_{Nn}^n\}$ may have a dimension of m. A size of each codebook may be determined based on relation of $N_2 \leq \ldots \leq N_{Mt}$ because a relatively larger dimensional codebook uses a relatively larger codebook size to maintain a similar quantization error compared to relatively lower dimensional codebooks.

When quantizing a column including r of which a row index is less than a column index of $r_{mn}$ (i.e., m<n), the $n^{th}$ column of B may be quantized using a codebook $F_m = \{f_1^m, f_2^m, \ldots, f_{Nm}^m\}$. In this example, $F_m = \{f_1^m, f_2^m, \ldots, f_{Nm}^m\}$ corresponds to an n-dimensional codebook, and thus, each codeword included in $F_m = \{f_1^m, f_2^m, \ldots, f_{Nm}^m\}$ may have a dimension of n.

Descriptions are further made using the following examples:

Example 1) with respect to a 4×4 channel matrix with M=4
Codebooks for quantizing columns of B may be given by $$F_2 = \{f_1^2, f_2^2, \ldots, f_{N2}^2\}$$

$$F_3 = \{f_1^3, f_2^3, \ldots, f_{N3}^3\}$$

$$F_4 = \{f_1^4, f_2^4, \ldots, f_{N4}^4\}$$

For example, a first column of B has an effective dimension of 1 at all times and includes "1" as an element. Accordingly, a quantization may not be used. $F_2 = \{f_1^2, f_2^2, \ldots, f_{N2}^2\}$ corresponds to a two-dimensional unit norm vector codebook used to quantize a second column of B, $F_3 = \{f_1^3, f_2^3, \ldots, f_{N3}^3\}$ corresponds to a three-dimensional unit norm vector codebook used to quantize a third column of B, and $F_4 = \{f_1^4, f_2^4, \ldots, f_{N4}^4\}$ corresponds to a four-dimensional unit norm vector codebook used to quantize a fourth column of B. For example, the sizes of the corresponding codebooks may be determined as $N_2=4$, $N_3=8$, and $N_4=16$.

Example 2) with respect to a 4×4 channel matrix with M=3:
An R matrix of a channel matrix H may be given by $$R_{3 \times 4} = \begin{bmatrix} r_{11} & q_1^* h_2 & q_1^* h_3 & q_1^* h_4 \\ 0 & r_{22} & q_2^* h_3 & q_2^* h_4 \\ 0 & 0 & r_{33} & r_{34} \end{bmatrix}$$

$$= \begin{bmatrix} 1 & q_1^* \tilde{h}_2 & q_1^* \tilde{h}_3 & q_1^* \tilde{h}_4 \\ 0 & \tilde{r}_{22} & q_2^* \tilde{h}_3 & q_2^* \tilde{h}_4 \\ 0 & 0 & \tilde{r}_{33} & \tilde{r}_{34} \end{bmatrix} \text{diag}(\|h_1\|, \|h_2\|, \|h_3\|, \|h_4\|)$$

$$= BD$$

Codebooks for quantizing columns of B may be given by $$F_2 = \{f_1^2, f_2^2, \ldots, f_{N2}^2\}$$

$$F_3 = \{f_1^3, f_2^3, \ldots, f_{N3}^3\} = F_4$$

Because a third column and a fourth column of B correspond to a three-dimensional unit norm vector with the same structure and the same distribution, $F_3 = F_4$. For example, the sizes of the corresponding codebooks may be determined as $N_2 = 4$ and $N_3 = 8 = N_4$.

Diagonal terms of a D matrix are Chi random variables. Accordingly, each of the diagonal elements of D may be quantized by a vector codebook $D = \{d_1, \ldots, d_k\}$ where $d_n \in C^{Mt \times 1}$. By using the vector codebook $D = \{d_1, \ldots, d_k\}$, the diagonal elements of D may be quantized to $$d = \underset{d_i \in D}{\text{argmin}} \left\| d_i - \begin{bmatrix} \|h_1\| \\ \vdots \\ \|h_{Mt}\| \end{bmatrix} \right\|^2$$

For Example 1) and Example 2), the quantized R matrices may be expressed by $$\hat{R}_{4 \times 4} = \begin{bmatrix} \begin{bmatrix} 1 \\ 0_{3 \times 1} \end{bmatrix} \begin{bmatrix} f_2 \\ 0_{2 \times 1} \end{bmatrix} \begin{bmatrix} f_3 \\ 0_{1 \times 1} \end{bmatrix} f_4 \end{bmatrix} \text{diag}(d)$$

$$\hat{R}_{3 \times 4} = \begin{bmatrix} \begin{bmatrix} 1 \\ 0_{2 \times 1} \end{bmatrix} \begin{bmatrix} f_2 \\ 0_{1 \times 1} \end{bmatrix} f_3 \; f_4 \end{bmatrix} \text{diag}(d)$$

Figure 6:
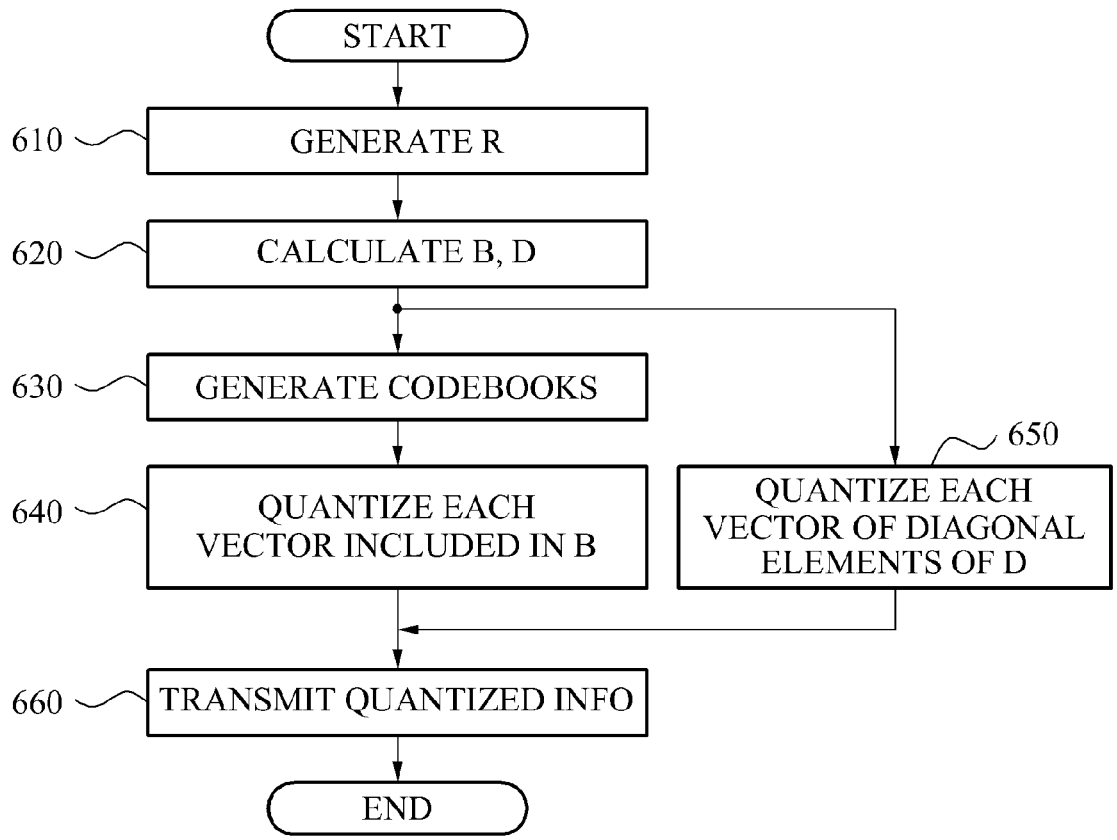
FIG. 6 is a flowchart illustrating an example of a communication method of a receiver configured to generate a matrix of a lower dimensional form, and to perform feedback using the matrix of the lower dimensional form.

FIG. 6 illustrates an example of a communication method of a receiver configured to generate a matrix of a lower dimensional form, and to perform feedback using the matrix of the lower dimensional form. In this example, the receiver generates a matrix of a lower dimensional form through triangularization of a channel matrix or a channel covariance matrix.

Referring to FIG. 6, in 610, the receiver generates a matrix R into the lower dimensional form through triangularization of the channel matrix or the channel covariance matrix. For example, each of the channel matrix and the channel covariance may include a plurality of channel vectors.

For example, when the matrix R is generated based on a channel matrix H, an effective dimension of each of column vectors included in the matrix R may be less than or equal to a dimension of each of the channel vectors included in the channel matrix. For example, the matrix R may be generated as below $$R_{3 \times 4} = \begin{bmatrix} r_{11} & q_1^* h_2 & q_1^* h_3 & q_1^* h_4 \\ 0 & r_{22} & q_2^* h_3 & q_2^* h_4 \\ 0 & 0 & r_{33} & r_{34} \end{bmatrix}$$

$$= \begin{bmatrix} 1 & q_1^* \tilde{h}_2 & q_1^* \tilde{h}_3 & q_1^* \tilde{h}_4 \\ 0 & \tilde{r}_{22} & q_2^* \tilde{h}_3 & q_2^* \tilde{h}_4 \\ 0 & 0 & \tilde{r}_{33} & \tilde{r}_{34} \end{bmatrix} \text{diag}(\|h_1\|, \|h_2\|, \|h_3\|, \|h_4\|)$$

$$= BD$$

In this example, when two "0" elements are excluded with respect to a first column vector of R, an effective dimension of the first column vector is "1" and the effective dimension of the first column vector is less than or equal to a dimension of each of the channel vectors.

In 620, the receiver calculates a matrix B with unit norm vectors and a diagonal matrix D based on the generated matrix R.

In 630, the receiver generates codebooks corresponding to respective vectors included in the matrix of the lower dimensional form, based on the effective dimension of to each of the vectors included in the matrix of the lower dimensional form. The effective dimension may be the same as an effective dimension of each of the vectors included in the matrix B with the unit norm vectors.

For example, for $$R_{3 \times 4} = \begin{bmatrix} r_{11} & q_1^* h_2 & q_1^* h_3 & q_1^* h_4 \\ 0 & r_{22} & q_2^* h_3 & q_2^* h_4 \\ 0 & 0 & r_{33} & r_{34} \end{bmatrix}$$

$$= \begin{bmatrix} 1 & q_1^* \tilde{h}_2 & q_1^* \tilde{h}_3 & q_1^* \tilde{h}_4 \\ 0 & \tilde{r}_{22} & q_2^* \tilde{h}_3 & q_2^* \tilde{h}_4 \\ 0 & 0 & \tilde{r}_{33} & \tilde{r}_{34} \end{bmatrix} \text{diag}(\|h_1\|, \|h_2\|, \|h_3\|, \|h_4\|)$$

$$= BD,$$

the receiver may generate the codebooks as below $$F_2 = \{f_1^2, f_2^2, \ldots, f_{N2}^2\}$$

$$F_3 = \{f_1^3, f_2^3, \ldots, f_{N3}^3\} = F_4$$

In 640, the receiver performs quantization using each of the generated codebooks. For example, quantization of the vectors included in the matrix B may be the same as quantization of the vectors included in the matrix of the lower dimensional form.

In 650, the receiver quantizes each of vectors of diagonal elements of D.

In 660, the receiver transmits the quantized information to the transmitter.

A Scheme to Quantize a Channel Covariance Matrix as a Whole

The channel covariance matrix may be quantized using the following equation $$\frac{E[\min_{Q \in \mathcal{Q}} \|vec(H^*H) - vec(Q)\|]}{(*)}$$

In this example, $Q=\{Q_1, \ldots, Q_N\}$ corresponds to a codebook for quantizing the channel covariance matrix and vec (A) corresponds to a function to vectorize a matrix A. The codebook using the above equation may not maximize a system throughput.

An equation to design the codebook using an averaged instantaneous capacity may be given by $$\frac{E[\max_{Q \in \mathcal{Q}} \log_2(\det(I_{M_r} + \rho H Q H^*))]}{(**)}$$

In this example, E[A] corresponds to an average of A and $I_{M_r}$ corresponds to an Mr×Mr identity matrix. Also, ρ corresponds to a signal-to-noise ratio (SNR) and (**) designs the codebook used to quantize the covariance channel matrix maximizing the average capacity.

For example, a codebook Q may be designed using (). The codebook Q designed using () is also a function of the SNR, and the codebook designed with the criterion () may be expressed by $Q_\rho$. In (), a power constraint of Q, i.e., tr(Q)=1 may exist.

A Lloyd algorithm may be applied to maximize the following equation $$\max_{Q_\rho \, s.t. \, tr(Q)=1} E[\log_2(\det(I_{M_r} + \rho H Q H^*))]$$

A plurality of codebooks may be designed depending on the SNR. For example, the above approach may be effectively used when a rank of a corresponding codebook is determined using a function of the SNR.

For example, in a high SNR region, the codebook $Q_\rho$ may include a plurality of codewords where ranks of most of the codewords are close to min {Mr,Mt}. As another example, in a low SNR region, the codebook $Q_\rho$ may include a plurality of codewords with relatively low ranks. This implies that when an instantaneous channel covariance matrix is quantized using $Q_\rho$, a quantizer may not have to take a rank into account to a codebook structure. Accordingly, the only operation is switching of the codebook depending on the SNR. When configuring $Q_\rho$ using a Hermitian property of $Q_\rho$, it is possible to save $$\frac{M_t^2 + M_t}{2}$$

elements that correspond to $M_t$ diagonal elements and $$\frac{M_t^2 - M_t}{2}$$

upper off block diagonal elements.

A Scheme to jointly Quantize CDI and CQI

An example of disjointly generating the CDI and the CQI is described above with reference to FIG. 6. For example, in a QR decomposition of H, a direction and an amplitude of the R matrix may be disjointly quantized in FIG. 6. For example, it is possible to jointly quantizing the R matrix by employing a capacity criterion.

For example, $R_\rho = \{R_1, \ldots, R_N\}$ may be designed by a Lloyd algorithm with a capacity constraint as below $$\max_{R_\rho} E[\log_2(\det(I_{M_r} + \rho H(R^*R/tr(R^*R))H^*))]$$

The rank of codewords included in $R_\rho$ may vary depending on the SNR. Accordingly, switching of the codebook depending on the SNR may be applicable.

Quantization may also be performed using the following equation:

$$R_s = \operatorname*{argmax}_{R_s \in R_\rho} \log_2(\det(I_{M_r} + \rho H(R_s^*R_s/tr(R_s^*R_s))H^*))$$

Figure 7:
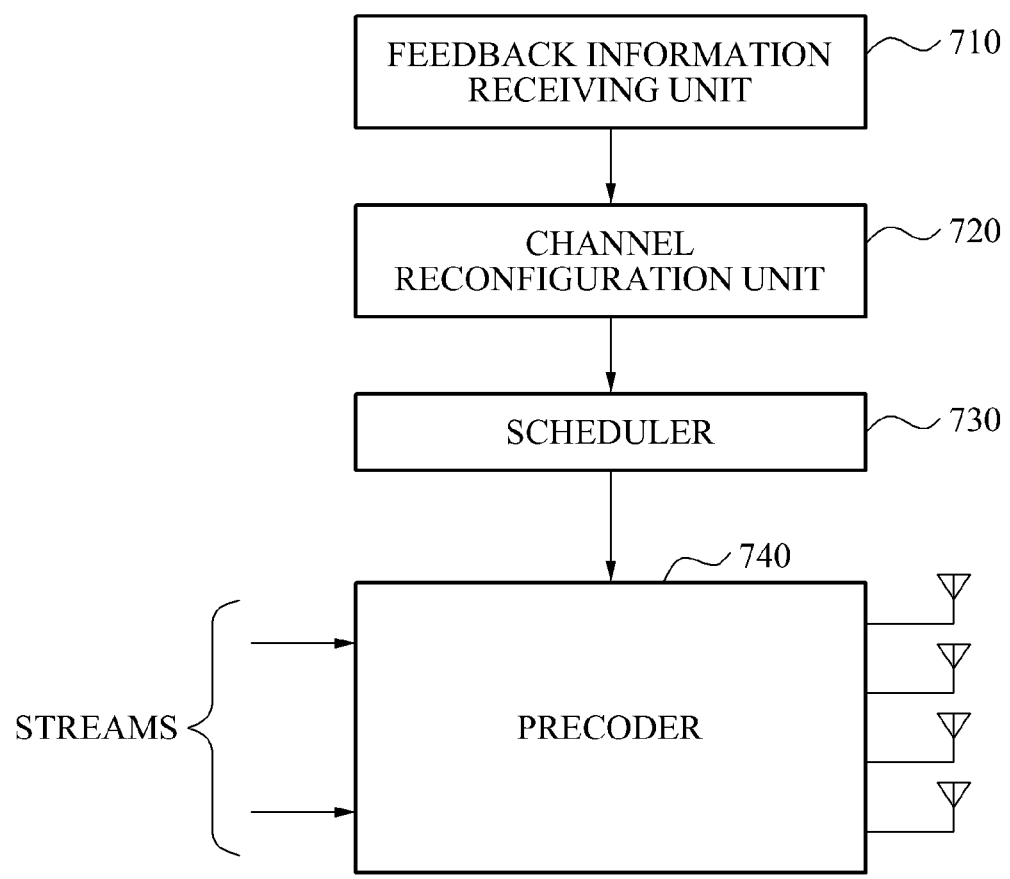
FIG. 7 is a diagram illustrating an example of a transmitter.

FIG. 7 illustrates an example of a transmitter.

Referring to FIG. 7, the transmitter includes a feedback information receiving unit 710, a channel reconfiguration unit 720, a scheduler 730, and a precoder 740.

The feedback information receiving unit 710 may receive a PMI or CDI and CQI from one or more receivers. The feedback information receiving unit 710 may further to receive information associated with a preferred rank of each of the receivers. For example, the feedback information may include the PMI, the CQI, and information associated with the preferred rank.

The channel reconfiguration unit 720 may reconfigure a channel matrix or a channel covariance matrix based on the PMI and the CQI using a codebook generated according to the aforementioned schemes. Although not illustrated in FIG. 7, the transmitter may further include a module to generate the codebook according to the aforementioned schemes, and a memory to store the codebook.

The scheduler 730 may determine a transmission rank for receiving data streams. The scheduler 730 may determine an optimal precoding matrix corresponding to the transmission rank based on the channel matrix or the channel covariance matrix.

The precoder 740 may precode at least one data stream using the precoding matrix.

Figure 8:
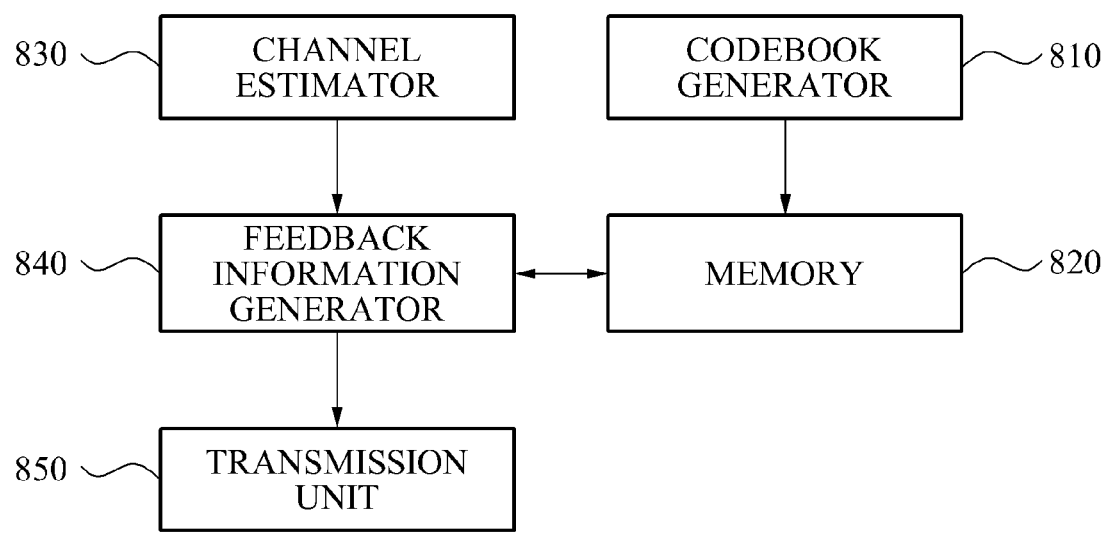
FIG. 8 is a diagram illustrating an example of a receiver.

FIG. 8 illustrates an example of a receiver.

Referring to FIG. 8, the receiver includes a codebook generator 810, a memory 820, a channel estimator 830, a feedback information generator 840, and a transmission unit 850.

The codebook generator 810 may generate optimal codebooks according to the aforementioned schemes, and store the generated codebooks in the memory 820. For example, when a channel is estimated by the channel estimator 830 and then a channel matrix or a channel covariance matrix is calculated, the feedback information generator 840 may generate a PMI, CQI, and the like as feedback information, using the codebooks stored in the memory 820. The transmission unit 850 may transmit, to a transmitter, the feedback information such as the PMI and the CQI.

Descriptions made above with reference to FIG. 1 through FIG. 6 are applicable to the transmitter of FIG. 7 and the receiver of FIG. 8, and thus, further description will be omitted here.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a receiver, the communication method comprising:
    calculating an eigenvector matrix comprising eigenvectors of a channel matrix or a channel covariance matrix;
    generating a codebook for each eigenvector of the eigenvector matrix such that each codebook has a different size based on eigenvalues of the channel matrix or the channel covariance matrix;
    quantizing each of the eigenvectors using the respective codebook for each eigenvector; and
    transmitting, to a transmitter, information associated with each of the quantized eigenvectors;
    wherein the generating comprises generating a largest size codebook for a codebook corresponding to a dominant eigenvector from among the eigenvectors,
    wherein the quantizing comprises:
        quantizing an ith eigenvector using the codebook corresponding to the ith eigenvector;
        projecting the codebook corresponding to an (i+1)th eigenvector onto a null space of the quantized ith eigenvector; and
        quantizing the (i+1)th eigenvector using the projected codebook corresponding to the (i+1)th eigenvector.

2. The communication method of claim 1, wherein the generating comprises assigning a weight to the size of the codebook corresponding to each of the eigenvectors based on each of the eigenvectors.

3. The communication method of claim 1, wherein, when the eigenvector matrix comprises a first eigenvector and a second eigenvector, and the first eigenvector corresponds to a first eigenvalue and the second eigenvector corresponds to a second eigenvalue that is less than the first eigenvalue, the generating comprises generating a larger size codebook for the first eigenvector in comparison to the size of the codebook generated for the second eigenvector.

4. The communication method of claim 1, wherein:
    the generating comprises generating the codebook corresponding to an $(i+1)^{th}$ eigenvector having the size less than the size of the codebook corresponding to an $i^{th}$ dominant eigenvector, using the codebook corresponding to the $i^{th}$ dominant eigenvector, when the $i^{th}$ dominant eigenvector is quantized using the codebook corresponding to the $i^{h}$ dominant eigenvector, and
    the quantizing comprises:
        projecting the codebook corresponding to the $(i+1)t^{h}$ eigenvector onto a null space of the quantized $i^{th}$ eigenvector; and
    quantizing the $(i+1)^{th}$ eigenvector using the projected codebook corresponding to the $(i+1)^{th}$ eigenvector.

5. The communication method of claim 1, further comprising:
    quantizing each eigenvalue using a scalar codebook such that each eigenvalue is quantized using the scalar codebook having a different size; and
    transmitting, to the transmitter, information associated with each of the eigenvalues quantized.

6. A communication method of a transmitter, the communication method comprising:
    generating a codebook for each eigenvector of a channel matrix or a channel covariance matrix, such that each codebook has a different size based on eigenvalues of the channel matrix or the channel covariance matrix;

receiving information associated with each of quantized eigenvectors; and obtaining the quantized eigenvectors using information associated with each of the quantized eigenvectors and the respective codebooks for each eigenvector, wherein the generating comprises generating the largest size codebook for a codebook corresponding to a dominant eigenvector from among the eigenvectors, wherein each of the eigenvectors is quantized by quantizing an ith eigenvector using the codebook corresponding to the ith eigenvector, projecting the codebook corresponding to an (i+1)th eigenvector onto a null space of the quantized ith eigenvector, and quantizing the (i+1)th eigenvector using the projected codebook corresponding to the (i+1)th eigenvector.

7. A non-transitory computer-readable storage medium having stored therein program instructions to cause a processor to execute a communication method of a receiver, the communication method comprising:

calculating an eigenvector matrix comprising eigenvectors of a channel matrix or a channel covariance matrix;

generating a codebook for each eigenvector of the eigenvector matrix such that each codebook has a different size based on eigenvalues of the channel matrix or the channel covariance matrix;

quantizing each of the eigenvectors using the respective codebook for each eigenvector; and transmitting, to a transmitter, information associated with each of the quantized eigenvectors, wherein the generating comprises generating a largest size codebook for a codebook corresponding to a dominant eigenvector from among the eigenvectors, wherein the quantizing comprises:

quantizing an ith eigenvector using the codebook corresponding to the ith eigenvector;

projecting the codebook corresponding to an (i+1)th eigenvector onto a null space of the quantized ith eigenvector; and quantizing the (i+1)th eigenvector using the projected codebook corresponding to the (i+1)th eigenvector.

8. A terminal comprising:

a codebook generator configured to calculate an eigenvector matrix that comprises a plurality of eigenvectors of a channel matrix or a channel covariance matrix which are based on a channel formed between the terminal and a receiver, configured to generate a codebook for each eigenvector of the eigenvector matrix, and configured to quantize each respective eigenvector; and a transmitter configured to transmit information about the quantized eigenvectors to the receiver, wherein the codebook generator generates at least two codebooks of different size based on eigenvalues of each eigenvector and wherein the codebook generator generates a larger size codebook for dominant eigenvectors and generates a smaller size codebook for non-dominant eigenvectors, wherein the codebook generator is further configured to quantize an ith eigenvector using the codebook corresponding to the ith eigenvector, project the codebook corresponding to an (i+1)th eigenvector onto a null space of the quantized ith eigenvector, and quantize the (i+1)th eigenvector using the projected codebook corresponding to the (i+1)th eigenvector.

9. The terminal of claim 8, wherein the codebook generator generates a largest size codebook for an eigenvector comprising the largest eigenvalue.

10. The terminal of claim 8, wherein the codebook generator generates a smallest size codebook for an eigenvector comprising the smallest eigenvalue.

* * * * *